United States Patent [19]
Dzurkovich et al.

[11] Patent Number: 4,825,579
[45] Date of Patent: * May 2, 1989

[54] DISPOSABLE CARTRIDGE ASSEMBLY FOR USE WITH RODENT TRAPS

[75] Inventors: Damon Dzurkovich, Reading; Joseph A. Dzurkovich, Shillington, both of Pa.

[73] Assignee: Pak-A-Rat Corporation, Sinking Springs, Pa.

[*] Notice: The portion of the term of this patent subsequent to Nov. 3, 2004 has been disclaimed.

[21] Appl. No.: 114,570

[22] Filed: Oct. 29, 1987

Related U.S. Application Data

[63] Continuation-in-part of Ser. No. 50,873, May 18, 1987, Pat. No. 4,703,583.

[51] Int. Cl.[4] .............................................. A01M 23/24
[52] U.S. Cl. ...................................................... 43/82
[58] Field of Search .................... 43/61, 77, 79, 81, 82

[56] References Cited

U.S. PATENT DOCUMENTS

| | | | |
|---|---|---|---|
| 1,473,242 | 11/1923 | Marshall | 43/81 |
| 1,709,199 | 4/1929 | Thayer | 43/81 |
| 3,769,742 | 11/1973 | Spain et al. | 43/81 |
| 4,122,625 | 10/1978 | Ohtsuka | 43/82 |
| 4,403,438 | 9/1983 | West-Harron | 43/82 |

Primary Examiner—M. Jordan
Attorney, Agent, or Firm—Steele, Gould & Fried

[57] ABSTRACT

A disposable cartridge assembly is provided for use with a rodent trap of the kind having a movable spring-loaded striker bar operable in response to a trigger mechanism. The disposable cartridge with a generally flat base and a flexible sleeve with a rigid opening at least at one end is mounted on a rodent trap so that the sleeve is disposed adjacent to the trigger of the trap. The rodent enters the sleeve and activates the trigger to be trapped. The entire cartridge assembly is then disposed.

15 Claims, 4 Drawing Sheets

DISPOSABLE CARTRIDGE ASSEMBLY FOR USE WITH RODENT TRAPS

CROSS-REFERENCE TO RELATED APPLICATIONS

This application is a continuation-in-part of copending application Ser. No. 050,873, filed May 18, 1987, now U.S. Pat. No. 4,703,583.

BACKGROUND OF THE INVENTION

1. Field of the Invention

This invention relates to animal traps and, more particularly, to rodent traps.

2. Description of the Prior Art

Rodent control has been a problem for many years and there have been numerous traps designed to aid the householder with control of rodents. Among these is the baitless rodent trap of my previous patent application, Ser. No. 050,873 now U.S. Pat. No. 4,703,583 issued Nov. 3, 1987. In that application, a rodent trap with a removable cartridge was disclosed. The trap member is a modified trap of the kind having a movable spring-loaded striker bar operable in response to a trigger mechanism. The cartridge member includes means to secure the cartridge to the trap and a fabric sleeve mounted on toroidal collars is placed in position over the trigger mechanism. The rotent enters the collar and sleeve and triggers the trap. The sleeve is then removed for disposal of the rodent, or the entire cartridge may be disattached from the trap for rodent disposal.

Several problems were still to be solved with Ser. No. 050,873 premature springing of the trigger mechanism, and adjustable positioning of the cartridge member on traps without preformed slots.

There is, therefore, a need for a disposable cartridge assembly for a rodent trap which prevents premature springing of the trigger and allows adjustable positioning of the cartridge member on a trap.

SUMMARY OF THE DISCLOSURE

The aforementioned prior art problems are obviated by the disposable cartridge assembly of this invention. The assembly is intended for use with a rodent trap of the kind having a movable spring-loaded striker bar operable in response to a trigger mechanism. The cartridge assembly includes a flat-bottomed base which, preferably, includes a U-shaped cut-away area intermediate the base ends. The back of the cut-away area is approximately the width of the trap member's base so that the cartridge is press fit onto the end of the trap. The assembly also includes a flexible sleeve with a rigid opening at least at one end through which a rodent may enter. When the assembly is in position on the trap end, the sleeve covers the trigger mechanism. A rodent entering the sleeve springs the trigger and is trapped. The entire cartridge assembly is then removed from the trap for disposal. In order to prevent the sleeve from prematurely pressing on the trigger before the rodent reaches the trigger, a ridge at least the height of the trigger is provided around the cut-away, or the entire cartridge assembly is of a height at least that of the trigger.

The sleeve may be unitary with rigid openings or it may be a fabric sleeve attached to either a toroidal collar or a wire ring, the sleeve, collar or ring attachable to the base.

It is, therefore, an object of this invention to provide a disposable cartridge assembly for a rodent trap which is adaptable to fit any size rodent trap.

It is another object of this invention to provide a cartridge assembly for a rodent trap which is completely disposable and does not require the user to see or to touch the trapped rodent.

It is yet another object of this invention to provide a disposable cartridge assembly for a rodent trap which is not prematurely triggered by pressure from the sleeve itself.

It is a further object of this invention to provide a disposable cartridge assembly for a rodent trap which is unitary and clean to use, time after time, because no bait or animal remains touch the trap itself.

It is still another object of this invention to provide a disposable cartridge assembly for a rodent trap which is inexpensive to produce and simple to use.

These and other objects will be more readily ascertainable to one skilled in the art from a consideration of the following Figures, description and exemplary embodiments.

BRIEF DESCRIPTION OF THE DRAWING(S)

DETAILED DESCRIPTION OF THE PREFERRED EMBODIMENT(S)

Figure 1:
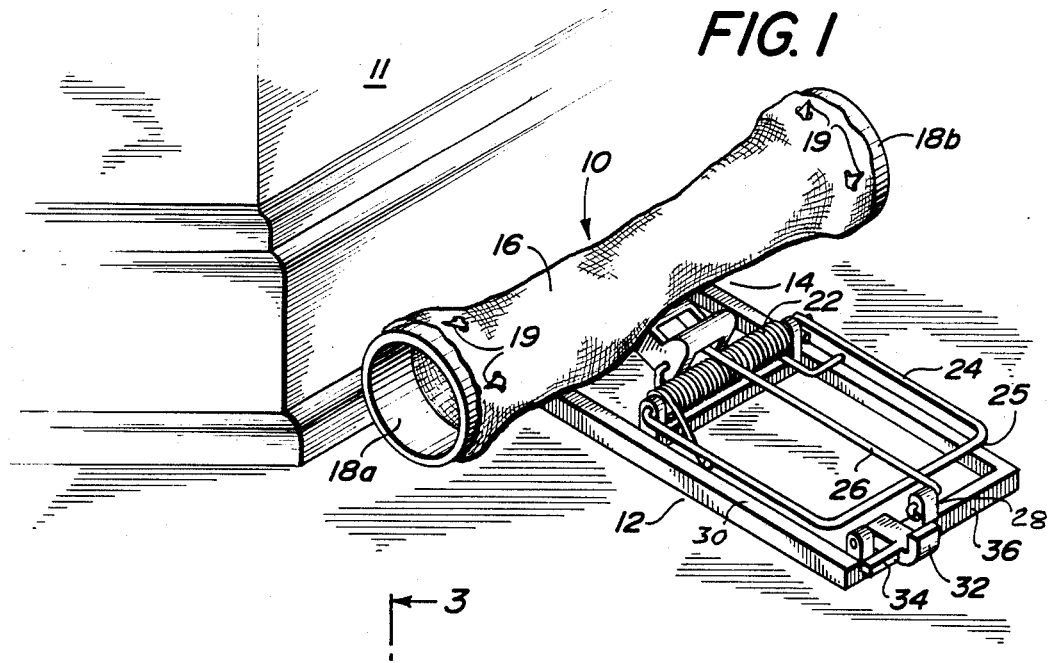
FIG. 1 is an isometric view of a rodent trap with a cartridge assembly of this invention attached and in position against a wall.

Referring now to the drawings, and more particularly to FIG. 1, rodent trap 10 with cartridge assembly 14 attached is seen in place against wall 11. Assembled rodent trap 10 has two sections, trap 12 and cartridge assembly 14. Trap 12 is seen to have base 30 and striker 24 rotatably held in spring 22 and latched in latch 28 by holder 26. Base 30 has base first end 36 and base second end 38 (seen in FIG. 2). Cartridge assembly 14, attached to trap base end 38, is seen to have toroidal collars 18a and 18b and sleeve 16 which, in this view, obscures base end 38 of trap member 12. Sleeve 16 forms a tunnel into which the rodent walks from either collar end. In the peferred embodiment, sleeve 16 is caught and removably held on collars 18a and 18b by hooks 19 which extend outward from collars 18a and 18b.

In use, trap 10 is placed near wall 11 so that the length of cartridge assembly 14 is parallel to wall 11, cartridge assembly 14 open at both collars 18a and 18b. A mouse (or other rodent) enters the tunnel formed by sleeve 16 and collars 18a and 18b from either sleeve end. When the animal steps onto trigger 40 (hidden in this view by sleeve 16 but seen in FIG. 2), holder 26 is released from latch 28, freeing striker 24 to rotate rapidly in spring 22, changing from set position at base first end 36 to sprung position at base second end 38. A householder may then remove sleeve 16 from collars 18a and 18b to dispose of mouse and sleeve without touching the mouse itself. In the preferred embodiment of the invention, the complete cartridge assembly 14 is removable so that cartridge assembly 14, sleeve 16, and rodent are disposed of together without the user touching the rodent.

Figure 2:
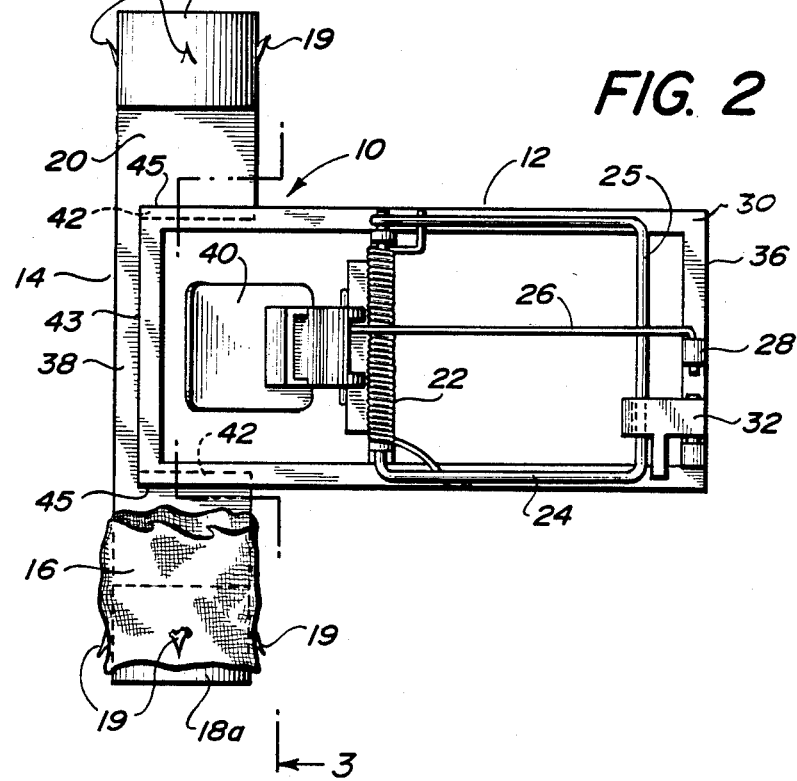
FIG. 2 is a top view of the rodent trap with a portion of the cartridge's sleeve cut away to expose the trap member's end.

Also seen in FIG. 1 is safety catch 32. During moving and positioning of rodent trap 10, catch 32 is slipped over crossbar 25 of striker 24 (as seen in FIG. 2) to prevent striker 24 from releasing prematurely and striking the user's fingers. This position is illustrated in FIG. 2. Once rodent trap 10 is positioned along wall 11, the user, grasping handle 34, flips safety catch 32 into the position illustrated in FIG. 1.

Thus, FIG. 1 illustrates the solution to two of the prior art problems with rodent traps. First, easy and sanitary disposal of animal remains is provided by disposable sleeve 16 and removable and disposable cartridge assembly 14. Second, safe and easy setting of the trap is provided because no bait is required and safety catch 32 prevents premature springing of the trap on the user's fingers.

Now referring to FIG. 2, a top view of assembled rodent trap 10 illustrates positioning of cartridge assembly 14 on trap 12. Trap 12 is seen to have base 30 with base first end 36 and base second end 38. Striker 24 is seen rotatably mounted in spring 22, striker crossbar 25 held in set position by holder 26 in latch 28 and safety catch 32. Trigger 40 is seen at base end 38.

Cartridge assembly 14 is seen on trap base end 38. Cartridge base 20 is seen to have collars 18a and 18b and a U-shaped cut-away section formed by back 43 and sides 45. Protruding arms 42 face each other on opposing sides 45. Trap base 30 is seen slidably received in the U-shaped cut-away. Sleever 16 (only partially shown in FIG. 2 to expose base end 38) is seen firmly held on collar 18a by hooks 19. Attachment of cartridge assembly 14 to trap 12 is seen better in FIGS. 3 and 4.

It should be noted that trigger 40 covers at least half of the width of base 30. A rodent walking through sleeve 16 is unable to avoid putting weight on at least a portion of trigger 40 to spring trap 10. No messy bait is necessary with trap 10. Sleeve 16 alone provides enticement to the rodent, relying on the animal's natural instinct to enter small dark passages. Since no bait is necessary, trigger 40 is preferably rather large and flat with no protrusions to catch on sleeve 16 or to become soiled. If the entire cartridge assembly 14 is removed and disposed of, as is preferred, the user touches neither messy bait nor the animal's remains.

Figure 3:
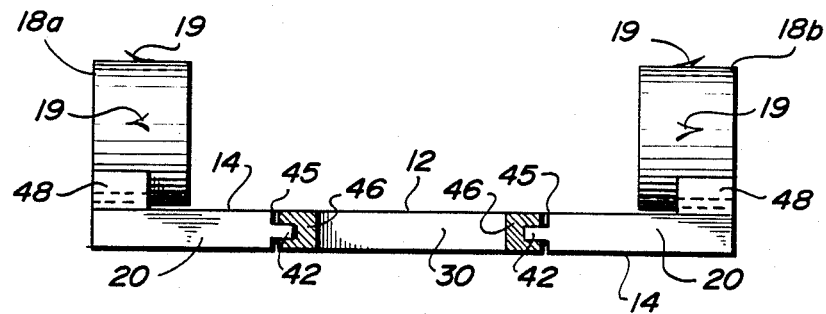
FIG. 3 is a cross section, taken on lines 3—3 of FIG. 2, showing one means of attachment of cartridge assembly to trap.

Now referring to FIG. 3, a cross section of assembled trap 10, taken on lines 3—3 of FIG. 2, illustrates one slide fit of cartridge assembly 14 to trap 12. Cartridge 14 is shown with collars 18a and 18b which each have hooks 19. Base 20 is seen to have facing arms 42 extending from sides 45 of the U-shaped cut-away seen in FIGS. 2 and 5. Base 30 of trap 12 is seen to have slotted areas 46 which receive arms 42 of cartridge 14. Whether made of plastic, as is preferred, or of wood or metal, cartridge 14 easily slides onto base 30 and is easily removed when an animal has been trapped.

Figure 4:
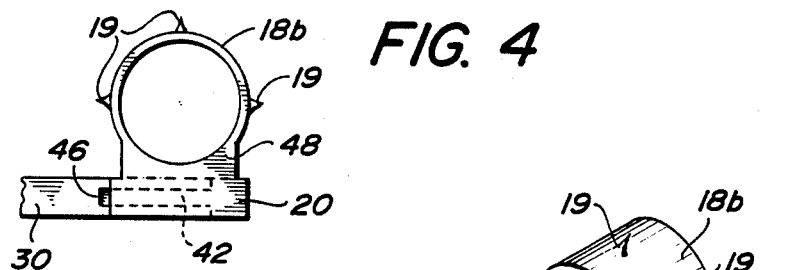
FIG. 4, is an end view, taken on lines 4—4 of FIG. 2, to illustrate the cartridge collar.
Figure 5:
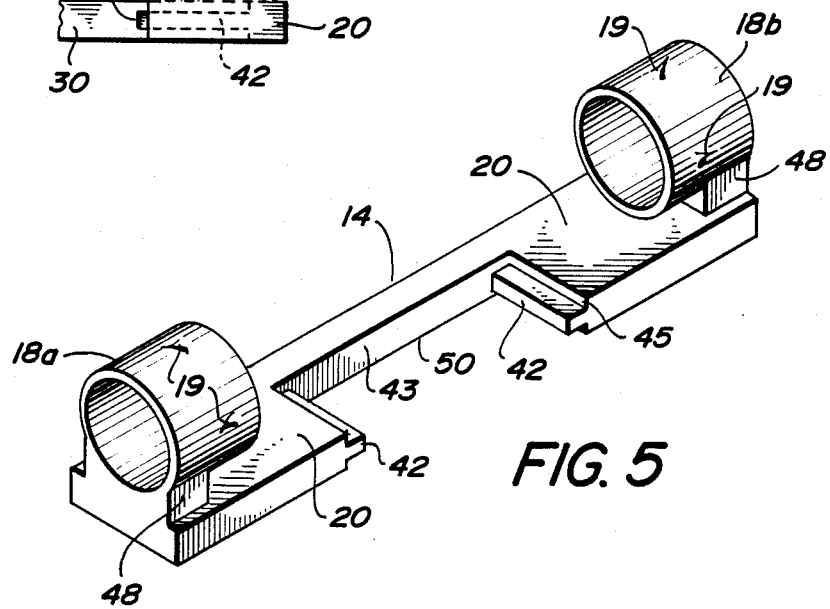
FIG. 5 is an isometric view of the cartridge assembly of FIG. 1 with the sleeve removed.

Also seen in FIG. 3 on cartridge 14 are pedestals 48 (detailed in FIGS. 4 and 5). Pedestals 48 raise collars 18a and 18b above the surface of base 20 so that sleeve 16 can be readily slipped onto collars 18a and 18b.

Now referring to FIG. 4, a partial end view shows collar 18b with hooks 19 extending outward to retain a sleeve 16. Arm 42 is seen received in the slot of area 46 of base 30. Pedestal 48 is holding collar 18b above the surface of bases 20 and 30.

Now referring to FIG. 5, cartridge assembly 14 is shown in an isometric view. Disposable cartridge assembly 14 has base 20 with U-shaped cut-away section 50. Section 50 has back wall 43 and side walls 45 from which arms 42 protrude. Back wall 43 is of a width to closely receive the entire width of base second end 38 of trap 12 (Seen in FIGS. 1,2, and 3). At the ends of base 20 are toroidal collars 18a and 18b which are supported by pedestals 48. Extending outward from collars 18a and 18b are hooks 19. It is preferable that the entire cartridge assembly 14 be disposable. But is it also possible to keep cartridge 14 mounted to trap member 12 and dispose of only sleeve 16.

Figure 6:
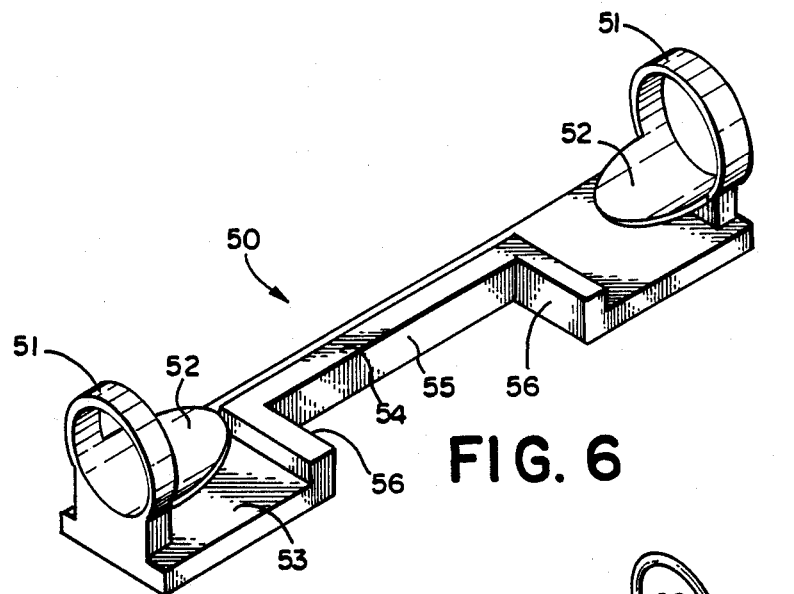
FIG. 6 illustrates an alternative embodiment of the disposable cartridge assembly with a raised ridge and extending tongues.
Figure 8:
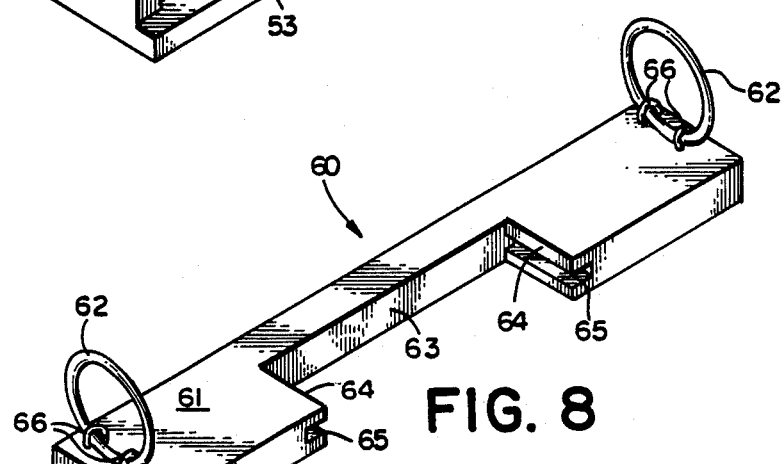
FIG. 8 illustrates another embodiment of the disposable cartridge assembly with wire ring collars and trap receiving slots.
Figure 7:
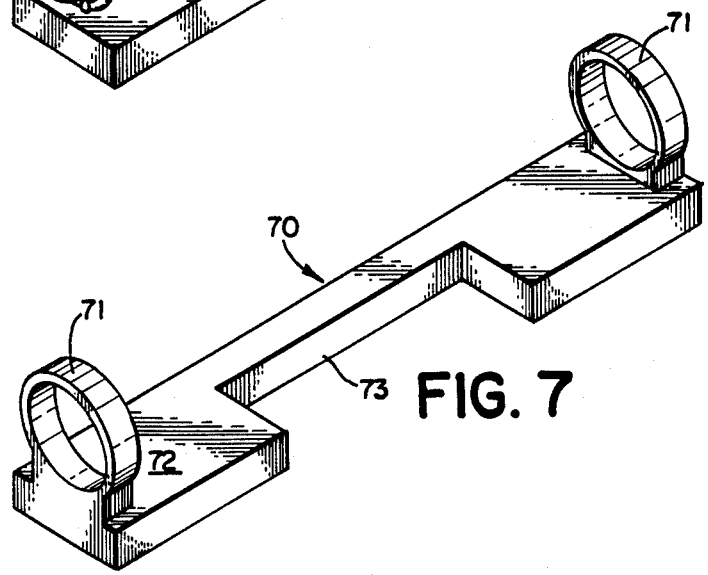
FIG. 7 illustrates an alternative embodiment of the disposable cartridge assembly with a thickened base.

Now referring to FIGS. 6, 7 and 8, alternative embodiments to the cartridge of this invention are illustrated, each embodiment being easily removed from a trap and readily disposable. FIG. 6 illustrates disposable cartridge 50 which has base 53, U-shaped cut-away area 57, collars 51, and tongues 52. U-shaped cut-away area has back 55 and sides 56 and is presized to press fit onto the end of a conventional mousetrap. Depending on the thickness of the trap used, premature triggering may happen when the sleeve is pressed at the collar end causing the sleeve to be pulled over the trigger and setting off the trap. In order to prevent premature triggering, raised ridge 54 is provided around the rim of U-shaped cut-away 57. Also, tongues 52 are provided extending from collars 51 inward. When a sleeve is in position, it will be supported by ridge 54 and tongues 52, preventing premature triggering.

Now referring to FIG. 7, alternative removable and disposable cartridge embodiment 70 is illustrated. Cartridge 70 has base 72, collars 71, and U-shaped cut-away 73. Again, a trap is press fit into U-shaped cut-away area 73. In order to prevent premature triggering, base 72 is of a thickness greater than that of the trap base, so that when a rodent steps on the sleeve, it will not press on the trigger, which will be lower than base 72.

Now referring to FIG. 8, alternative removable and disposable cartridge 60 is illustrated. Cartridge 60 has base 61, U-shaped cut-away 67 and rings 62. In this embodiment, collars are replaced with wire rings 62, which may prove to be more economical. Wire rings 62 are retained on base 61 by clips 66. U-shaped cut-away area 67 has back 63 and sides 64 into which slots 65 have been preformed. Slots 65 are sized to receive the thickness of a conventional mousetrap base in a slide fit. By providing the slot in the cartridge 60, no modifications need be made to the mousetrap itself.

Figure 9:
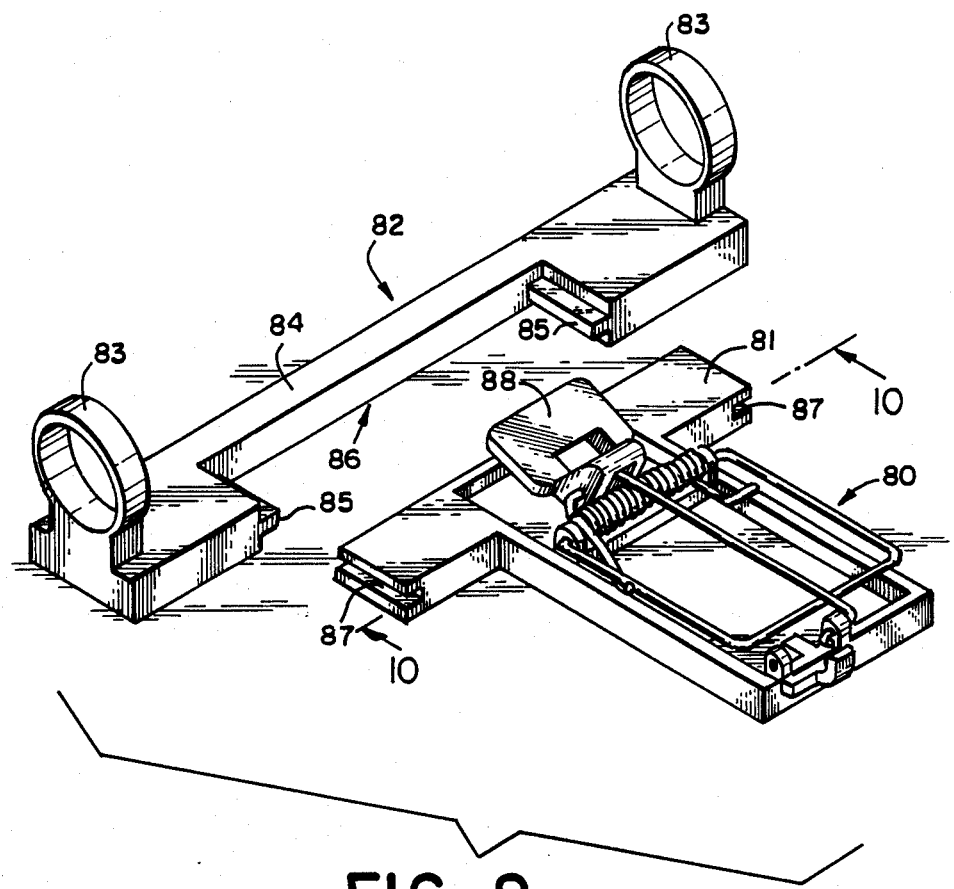
FIG. 9 illustrates in exploded view another embodiment of the disposable cartridge assembly with a modified trap.
Figure 10:
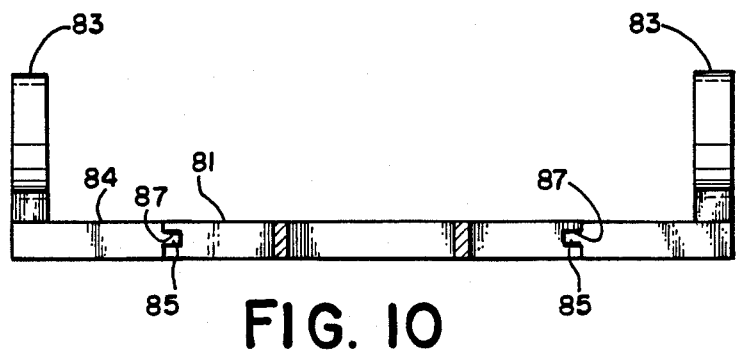
FIG. 10 is a cross section of the assembled trap and disposable cartridge of FIG. 9.

Now referring to FIGS. 9 and 10, another alternative embodiment of the disposable cartridge assembly of this invention is illustrated with a modified mousetrap. Mousetrap 80 is seen to be a conventional model with a spring-loaded striker bar operable in response to a trigger mechanism, as discussed in reference to FIGS. 1-5. Mousetrap 80, however, is modified to have an extended walkway area at its trigger end. Because cartridge 82 is intended to be disposable, it is desirable to keep the cost of the cartridge to a minimum. By eliminating material on the disposable element (at base 84) and increasing the area of the permanent member (trap 80 in extended area walkway 81), cartridge 82 will be less expensive to produce and replace.

In use, cartridge 82 and trap 80 are joined by sliding trap extended area walkway 81 into U-shaped cut-away area 86 on cartridge 82, slots 87 in area 81 receiving extending arms 85 in cut-away 86. When a rodent enters a collar 83 and steps into a sleeve (not shown), it is supported by walkway area 81 until it reaches trigger 88 to set off the trap. Because the rodent is placing weight on the trap element and not on the cartridge element, there is no danger of the sleeve being pulled to cause premature triggering.

In each of the alternative cartridge embodiments, the cartridge is adjustably mountable on the mousetrap. These adjustable fittings allow the user to position the sleeve in position over the trigger so that the rodent is struck by the striker bar when the trigger is released. In FIGS. 1-5, 8 and 9, the cartridge is secured to the trap by sliding an arm into a preformed slot. Once in place, the press fit of arm to slot prevents the assembly from slipping out of position. In FIGS. 6 and 7, the trap end is frictionally engaged by the cartridge assembly's U-shaped cut-away, frictional engagement preventing the assembly from slipping out of position. Thus, each cartridge is adjustably positioned, secured to the trap, yet readily removable and disposable.

Other means, such as pins, latches, interlocking clips, or the like may be used as the means to secure the cartridge assembly to the trap, retaining the sleeve in position over the trigger in such a manner that the trigger is released only when the rodent is correctly aligned with the striker bar. Any means which secures the sleeve in the correct alignment without the cartridge slipping out is within the scope of this invention.

There are several variations which can be practiced in the scope of this invention. First, ridge 54 may be provided to raise the sleeve above the trigger, or entire cartridge assembly 70 may be of a thickness greater than that of the trap base.

Second, toroidal collars may be used to retain a fabric sleeve. The toroidal collars may be replaced with wire rings 62 held to the base with clips, or the sleeve may be unitary with rigid ends.

The disposable cartridge assembly may be fitted with slots or arms to accommodate a trap, or the entire U-shaped slot may be sized to receive the trap width in a press fit.

Although it is preferable to dispose of only the cartridge assembly, some users may wish to dispose of the trap as well.

Also, although it is preferable to attach the cartridge assembly so that it forms a T with the trap, other orientations of cartridge to trap are within the scope of this invention.

And, although it is preferable to have the sleeve open at both ends, it is within the scope of this invention to have one end closed.

Additionally, it is preferred that no bait be utilized with this invention, but some users may add bait inside the sleeve, particularly if a closed end sleeve is used.

There are many advantages to the disposable cartridge assembly of this invention. Chiefly, the assembly may be used on any rodent trap without modification of the trap.

Second, the disposable cartridge of this invention allows the user to dispose of the trapped rodent without touching the remains.

Having now illustrated and described my invention, it is not intended that such description limit this invention, but rather that this invention be limited only by reasonable interpretation of the appended Claims.

What is claimed is:

1. A disposable cartridge assembly for use with a rodent trap of the kind having a movable spring-loaded striker bar operable in response to a trigger mechanism, the cartridge assembly comprising:
   (a) a generally flat base;
   (b) a flexible sleeve on said base, said sleeve having a substantially rigid opening at least one end thereof through which a rodent can enter the sleeve;
   (c) means for engaging and adjustably positioning the assembly on a trap with the sleeve disposed in the path of the striker bar, adjacent the trigger mechanism; and,
   (d) means for securing the assembly in position on the trap,
   whereby a rodent entering the sleeve will engage the trigger mechanism and be trapped in the sleeve by the striker bar, the entire cartridge assembly being thereafter removable and disposable without a need to see or directly handle the rodent.

2. The disposable cartridge assembly according to claim 1 wherein said assembly base includes a U-shaped cut-away intermediate said base ends, the back of said cut-away being approximately the width of said trap member.

3. The disposable cartridge assembly according to claim 2 wherein said assembly base includes a ridge circumscribing said U-shaped cut-away so that when said trap and said assembly are connected, said ridge is in a horizontal plane with said trigger to prevent premature triggering.

4. The disposable cartridge assembly according to claim 1 wherein said sleeve includes, additionally, an opposing second rigid opening at said sleeve other end.

5. The disposable cartridge assembly according to claim 1 wherein said trap has a base of a first thickness and said assembly base has a relative thickness greater than said trap's first thickness.

6. The disposable cartridge assembly according to claim 2 wherein said base includes, additionally, a set of parallel slots in said U-shaped cut-away's side walls, said slots of a height to slidably receive said trap base therein.

7. The disposable cartridge assembly according to claim 1 wherein said assembly includes, additionally, clips on said base to retain said flexible sleeve.

8. The disposable cartridge assembly according to claim 1 wherein said sleeve ends are wire rings.

9. The disposable cartridge assembly according to claim 1 including, additionally, a tongue extending outward from each said sleeve end, said tongue in the same horizontal plane as said trigger mechanism when said trap and said assembly are operably connected.

10. A baitless rodent trap with a disposable cartridge comprising:
    (a) a trap member including:
        (i) a flat base having two sides and first and second ends;

(ii) a wire striker pivotably secured to said upper surface of said base intermediate said first and second base ends for rotation between a set position and a sprung position;

(iii) a spring normally biasing said striker towards said sprung position;

(iv) latching means at said second base end for temporarily securing said striker in said set position;

(v) a trigger at said first base end operatively connected to said latching means for springing said striker when an animal contacts said trigger; and, (b) a generally elongated cartridge member removably attached substantially at a right angle to said trap's first base end, said cartridge including:

(i) an elongated, flat base with sides, two ends and a mid-section U-shaped area cut-away from one of the sides between said cartridge ends, the back of said cut-away area being approximately the width of said trap member's first base end;

(ii) a pair of facing toroidal collars mounted to said cartridge base ends; and, (iii) a disposable sleeve sized to overfit said collars and extend therebetween to cover said trigger and form a tunnel, whereby when a rodent enters said tunnel from one collar end and contacts said trigger by walking through said tunnel, said striker means is released for rotation into said sprung position, striking said rodent inside said tunnel, said cartridge and rodent together being thereafter discardable.

11. The rodent trap with disposable cartridge according to claim 10 wherein said U-shaped cut-away area includes protruding arms on said U-shaped sides and wherein the side edges of said trap member's extended base end include lengthwise slots.

12. The rodent trap with disposable cartridge according to claim 10 wherein said U-shaped cut-away area includes lengthwise slots on its side edges, said slots of a width predetermined to slidably receive said trap member's extended base end.

13. The baitless rodent trap according to claim 10 wherein said trap's base first end is transversely extended equally from both sides to cause said base to form a T.

14. A disposable cartridge assembly for use with a rodent trap of the kind having a movable spring-loaded striker bar operable in response to a trigger mechanism, the cartridge assembly comprising:

(a) a generally flat base;

(b) a flexible sleeve on said base, said sleeve having a substantially rigid opening at least at one end thereof through which a rodent can enter the sleeve;

(c) means for engaging and adjustably positioning the assembly at one end of a trap with the sleeve disposed in the path of the striker bar, adjacent the trigger mechanism; and, (d) means for securing the assembly in position on the trap by frictional engagement between the one end of the trap and the assembly, whereby a rodent entering the sleeve will engage the trigger mechanism and be trapped in the sleeve by the striker bar, the entire cartridge assembly being thereafter removable and disposable without a need to see or directly handle the rodent.

15. A baitless rodent trap with a disposable cartridge comprising:

(a) a trap member including:

(i) a flat base having two sides and first and second ends;

(ii) a wire striker pivotally secured to said upper surface of said base intermediate said first and second base ends for rotation between a set position and a sprung position;

(iii) a spring normally biasing said striker towards said spring position;

(iv) latching means at said second base end for temporarily securing said striker in said set position;

(v) a trigger at said first base end operatively connected to said latching means for springing said striker when an animal contacts said trigger; and, (b) a generally elongated cartridge member removably attached substantially at a right angle to said first base end, said cartridge including:

(i) an elongated, flat base with sides, two ends and a mid-section U-shaped area cut-away from one fo the sides between said cartridge ends, the back of said cut-away area being approximately the width of said trap member's first base end for press-fitted engagement therewith;

(ii) a pair of facing toroidal collars mounted to said cartridge base ends; and, (iii) a disposable sleeve sized to overfit said collars and extend therethrough to cover said trigger and form a tunnel, whereby when a rodent enters said tunnel from one collar end and contacts said trigger by walking through said tunnel, said striker means is released for rotation into said sprung position, striking said rodent inside said tunnel, said cartridge and rodent together being thereafter discardable.

* * * * *